(12) United States Patent
Spickler et al.

(10) Patent No.: US 10,029,602 B1
(45) Date of Patent: Jul. 24, 2018

(54) RECREATIONAL VEHICLE WITH RETRACTABLE SLEEPING UNIT

(71) Applicant: Forest River, Inc., Elkhart, IN (US)

(72) Inventors: Collin Cannon Spickler, Goodyear, AZ (US); Lamar Miller, Millersburg, IN (US); Dennis Mast, Ligonier, IN (US); Steven Miller, Ligonier, IN (US); Joe Mast, Shipshewana, IN (US)

(73) Assignee: Forest River, Inc., Elkhart, IN (US)

( * ) Notice: Subject to any disclaimer, the term of this patent is extended or adjusted under 35 U.S.C. 154(b) by 0 days.

(21) Appl. No.: 15/602,497

(22) Filed: May 23, 2017

Related U.S. Application Data

(60) Provisional application No. 62/340,144, filed on May 23, 2016.

(51) Int. Cl.
*B60P 3/39* (2006.01)
*A47C 17/16* (2006.01)

(52) U.S. Cl.
CPC ............ *B60P 3/39* (2013.01); *A47C 17/16* (2013.01)

(58) Field of Classification Search
CPC ...... B60P 3/32; B60P 3/34; B60P 3/38; B60P 3/39; A47C 17/16; A47C 17/162; A47C 17/17; A47C 17/175; A47C 17/1753; A47C 17/1756; A47C 17/22; A47C 17/38; A47C 17/46
USPC .............. 296/26.13, 69, 165, 170, 174, 175
See application file for complete search history.

(56) References Cited

U.S. PATENT DOCUMENTS

| | | | |
|---|---|---|---|
| 89,776 A | 5/1869 | Jones | |
| 341,140 A | 5/1886 | Haight | |
| 509,277 A | 11/1893 | Woodman | |
| 539,231 A | 5/1895 | McKee et al. | |
| 2,066,612 A | 1/1937 | Colman | |
| 2,528,768 A | 11/1950 | Marsh | |
| 2,637,856 A | 5/1953 | Woller | |
| D274,493 S | 7/1984 | Dyby | |
| 5,136,737 A | 8/1992 | Reppas et al. | |
| 5,280,656 A | 1/1994 | Gossett | |
| 5,690,355 A * | 11/1997 | Kleinberg | B60P 3/38 105/316 |
| 6,779,208 B2 | 8/2004 | Lim et al. | |
| 7,607,180 B2 | 10/2009 | Griepentrog | |
| 8,117,691 B2 | 2/2012 | Bishop | |
| 8,186,744 B1 * | 5/2012 | Hanser | B60P 3/39 296/170 |
| 8,424,132 B2 | 4/2013 | Stimel | |
| 8,950,021 B2 | 2/2015 | Stimel, Jr. | |

(Continued)

*Primary Examiner* — Gregory A Blankenship
(74) *Attorney, Agent, or Firm* — Barnes & Thornburg LLP (57) ABSTRACT

A sleeping unit for a vehicle having at least one side wall includes a first wall located inside the vehicle and spaced apart from the side wall of the vehicle, a second wall, a combined seating and sleeping unit and a retractable sleeping unit. The combined seating and sleeping unit has a first section and a second section and is movable from a first configuration in which the first and second sections are generally perpendicular to one another to a second configuration in which the first and second sections are generally parallel to one another. The retractable sleeping unit is movable from a first position in which it is located in the space between the first wall and the side wall of the vehicle to a second position in which it is located outside the space between the first wall and the side wall of the vehicle.

9 Claims, 8 Drawing Sheets

(56) References Cited

U.S. PATENT DOCUMENTS

| | | | |
|---|---|---|---|
| 9,027,178 B2 | 5/2015 | Wieland et al. | |
| 2005/0184546 A1* | 8/2005 | Kunz | A47B 21/0073 296/26.01 |
| 2016/0347230 A1* | 12/2016 | Pellicer | B60P 3/34 |
| 2017/0113594 A1* | 4/2017 | Pellicer | B60P 3/39 |
| 2017/0197537 A1* | 7/2017 | Gerzeny | B60P 3/34 |
| 2017/0259725 A1* | 9/2017 | Johnson | A47C 17/80 |

* cited by examiner

RECREATIONAL VEHICLE WITH RETRACTABLE SLEEPING UNIT

The present invention relates to a recreational vehicle and in particular to a recreational vehicle having a retractable sleeping unit.

SUMMARY OF THE INVENTION

In one embodiment of the present invention, a sleeping unit for a vehicle having a first wall and a second wall perpendicular to the first wall includes a first wall located inside the vehicle and spaced apart and extending generally parallel to the first wall of the vehicle, a second wall extending generally perpendicular to the first wall of the sleeping unit, a combined seating and sleeping unit and a retractable sleeping unit. The combined seating and sleeping unit is located adjacent the first wall of the sleeping unit and between the second wall of the vehicle and the second wall of the sleeping unit. The combined seating and sleeping unit has a first section and a second section and is movable from a first configuration in which the first and second sections are generally perpendicular to one another to a second configuration in which the first and second sections are generally parallel to one another. The retractable sleeping unit has a first side, a second side parallel to the first side, a front end perpendicular to the first and second sides, a first surface perpendicular to the first and second sides and the front end and a second surface spaced apart from the first surface and extending generally parallel to the first surface. First and second guide tracks are connected to the first and second sides, respectively, of the retractable sleeping unit. A first roller is connected to the second wall of the sleeping unit and engaged with the first guide track and a second roller connected to the second wall of the vehicle and engaged with the second guide track. The retractable sleeping unit is movable from a first position in which the retractable sleeping unit is located in the space between the first wall of the vehicle and the first wall of the sleeping unit and the first surface of the retractable sleeping unit is parallel to the first wall of the sleeping unit to a second position in which the retractable sleeping unit is located outside the space between the first wall of the vehicle and the first wall of the sleeping unit and the first surface of the retractable sleeping unit is generally perpendicular to the first wall of the sleeping unit. The retractable sleeping unit can be moved from the first position to the second position by moving the retractable sleeping unit vertically and pivoting the retractable sleeping unit about the first and second rollers.

In one embodiment of the invention, the retractable sleeping unit is movable toward the first wall of the vehicle when the retractable sleeping unit is in the second position.

In another embodiment of the present invention, a sleeping unit for a vehicle having a wall includes a first wall located inside the vehicle and spaced apart and extending generally parallel to the wall of the vehicle, a second wall extending generally perpendicular to the first wall, a combined seating and sleeping unit and a retractable sleeping unit. The combined seating and sleeping unit is located adjacent the first and second walls, has a first section and a second section and is movable from a first configuration in which the first and second sections are generally perpendicular to one another to a second configuration in which the first and second sections are generally parallel to one another. The retractable sleeping unit is movable from a first position in which the retractable sleeping unit is located in the space between the first wall and the wall of the vehicle to a second position in which the retractable sleeping unit is located outside the space between the first wall and the wall of the vehicle.

In one embodiment of the present invention, the retractable sleeping unit is located above the first and second walls when it is in the second position.

In another embodiment, the retractable sleeping unit includes a first side, a second side parallel to the first side, a front end perpendicular to the first and second sides, a first surface perpendicular to the first and second sides and the front end and a second surface spaced apart from the first surface and extending generally parallel to the first surface. In one embodiment, the first and second surfaces are generally perpendicular to the first wall when the retractable sleeping unit is in the second position. In another embodiment, the first and second surfaces are generally parallel to the first wall when the retractable sleeping unit is in the first position.

In one embodiment, the retractable sleeping unit further includes a first side having a first guide track, a second side spaced apart from the first side and having a second guide track, a first roller connected to the second wall and a second roller connected to the vehicle. The first and second guide tracks ride along the first and second rollers as the retractable sleeping unit is moved from the first position to the second position. In yet another embodiment, the retractable sleeping unit pivots about the first and second rollers as it is moved from the first position to the second position.

In one embodiment of the invention, the second wall includes a vertically extending surface facing the combination seating and sleeping unit and further includes a support member connected to the vertically extending surface of the second wall to support the retractable sleeping unit when it is in the second position.

DETAILED DESCRIPTION OF THE EMBODIMENTS OF THE INVENTION

Figure 1:
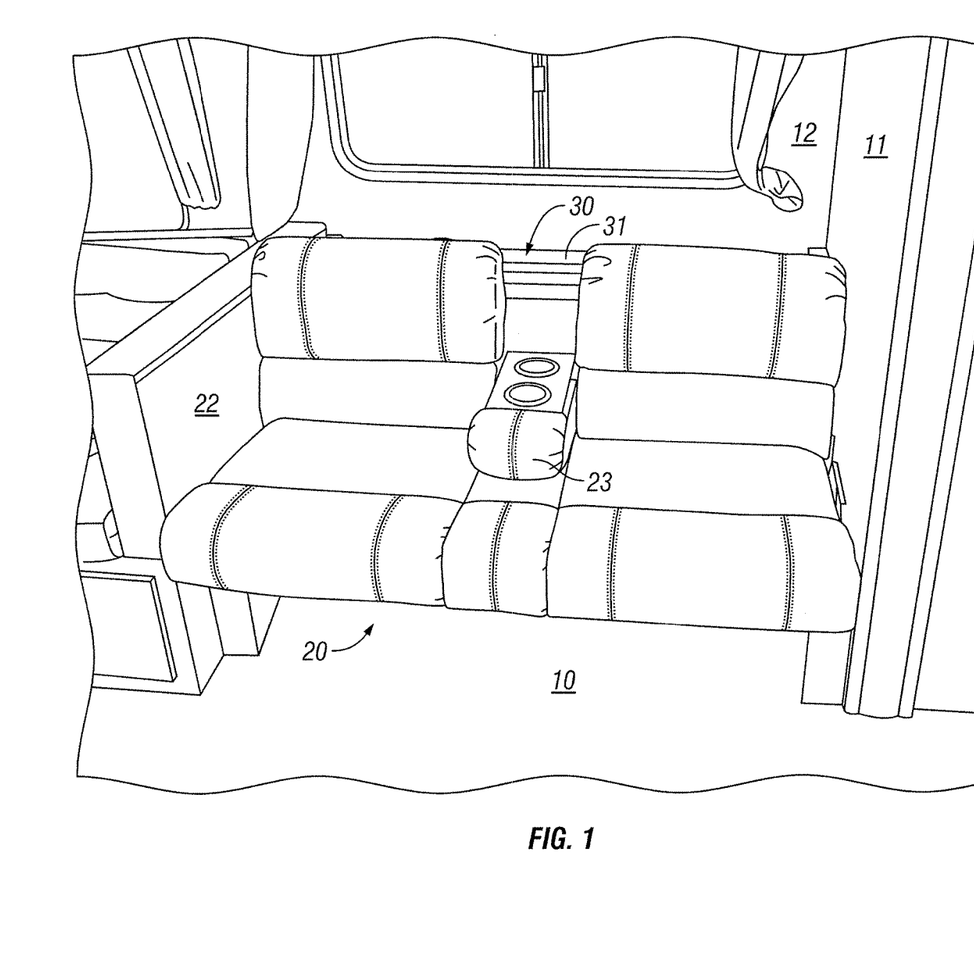
FIG. 1 is a front perspective view of a portion of the interior of a recreational vehicle illustrating a seating/sleeping component and a retractable sleeping unit according to one embodiment of the present invention.
Figure 2:
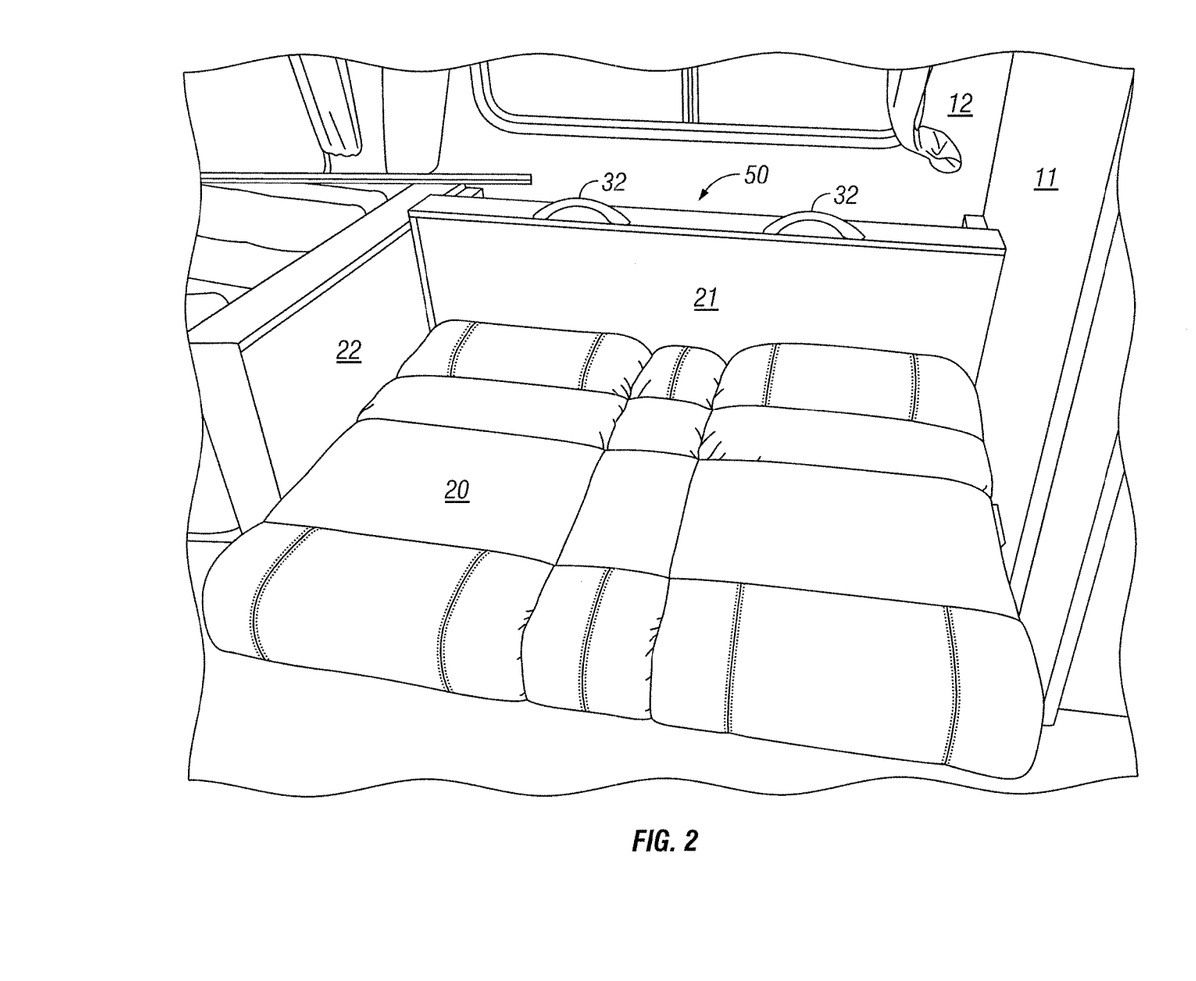
FIG. 2 is a front perspective view showing the seating/sleeping component of the embodiment of FIG. 1 in a horizontal orientation.
Figure 3:
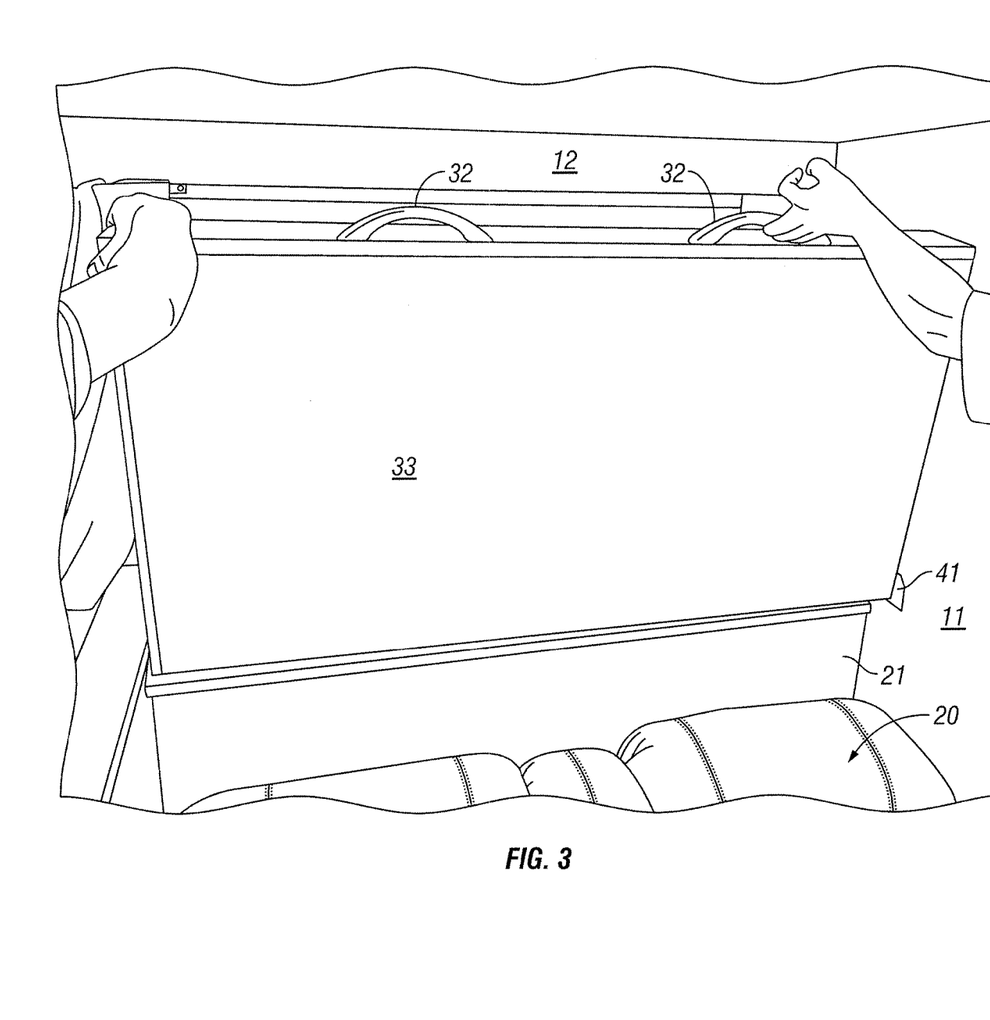
FIGS. 3-6 are front perspective views showing the retractable sleeping unit of the embodiment of FIG. 1 being moved from its retracted or stored position to its horizontal or deployed position.
Figure 4:
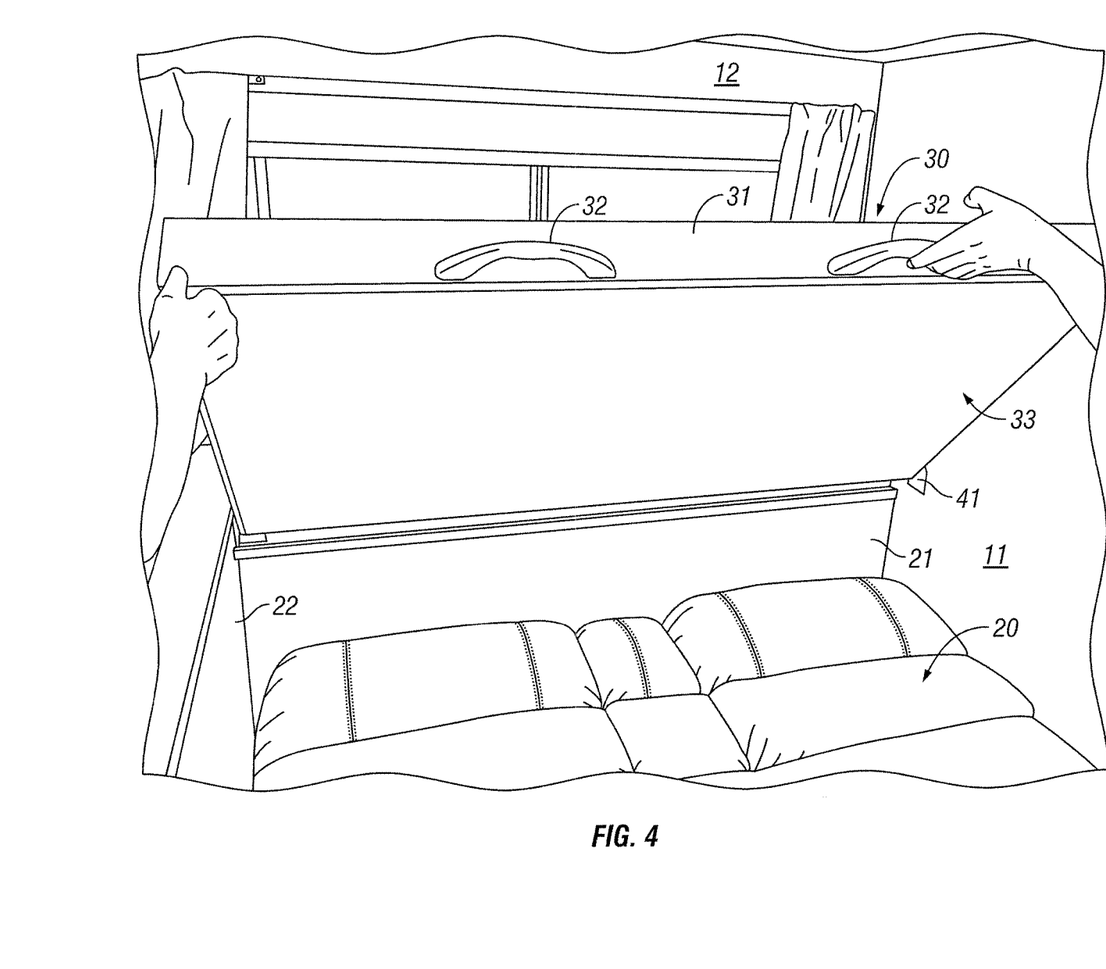
Figure 5:
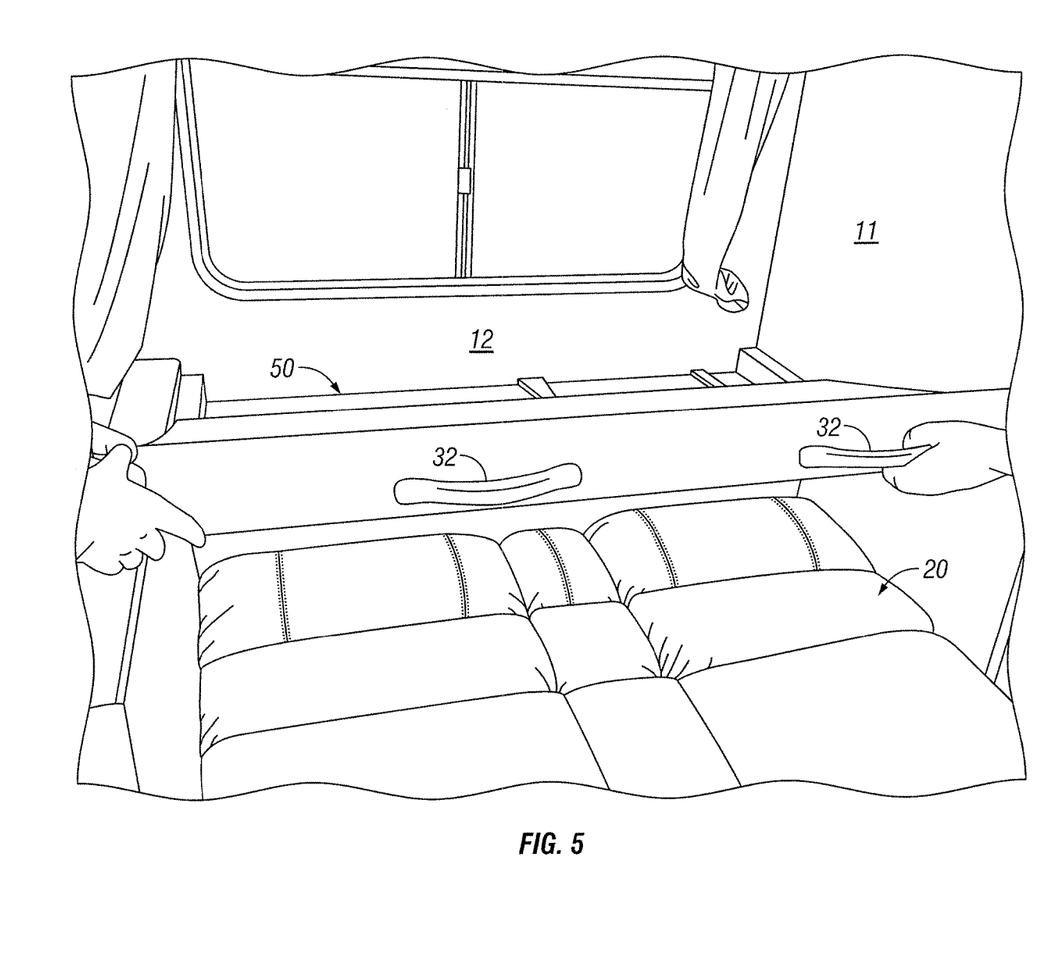

FIG. 1 is a front perspective view of a portion of the interior of a recreational vehicle illustrating a seating/sleeping component and a retractable sleeping unit according to one embodiment of the present invention. This embodiment of the present invention generally includes a recreational vehicle having a floor 10, a first wall 11 and a second wall 12 arranged generally perpendicular to first wall 11, a seating/sleeping unit 20 and a retractable sleeping unit 30. In the embodiment of FIG. 1, the seating/sleeping unit 20 is positioned between a first or rear wall 21, a second or side wall 22 and first wall 11 of the recreational vehicle. The seating/sleeping unit 20 may include a moveable arm rest and cup holder member 23. As shown in FIGS. 1 and 2, the seating/sleeping unit 20 may be moved from an upright seating configuration as shown in FIG. 1 to a fully horizontal or flat configuration as shown in FIG. 2.

Figure 6:
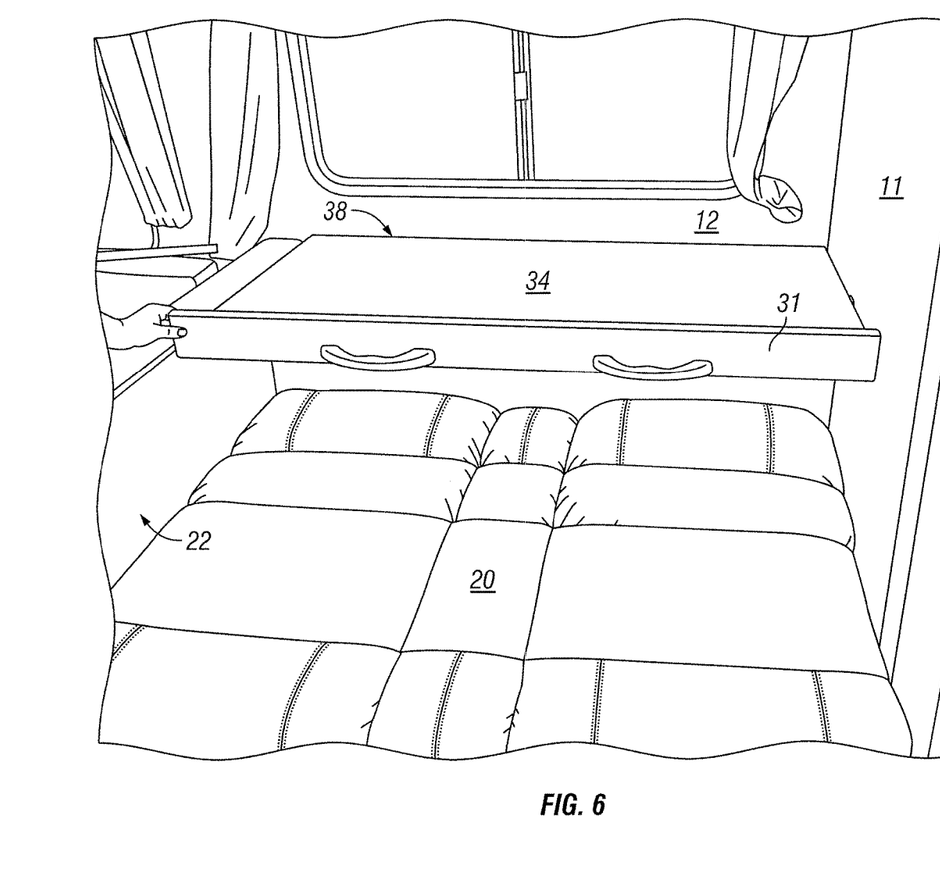

The retractable sleeping unit 30 in the embodiment shown may be moved from a vertical or stored position as shown in FIG. 1 to a horizontal or deployed position as shown in FIG. 6. Sleeping unit 30 in the embodiment shown generally includes a front end 31 having one or more handles 32 connected thereto. Unit 30 further includes a first surface 33 and a second surface 34 opposed thereto. Surfaces 33 and 34 are in a generally vertical orientation when unit 30 is stored as shown in FIG. 1 and in a substantially horizontal orientation with surface 34 facing upwardly when unit 30 is in its deployed or horizontal configuration as shown in FIG. 6. In the embodiment shown, sleeping unit 30 is located between first wall 21 and a cabinet or support structure 50 positioned adjacent second wall 12 of the recreational vehicle when in the stored position as shown in FIG. 1.

Figure 7:
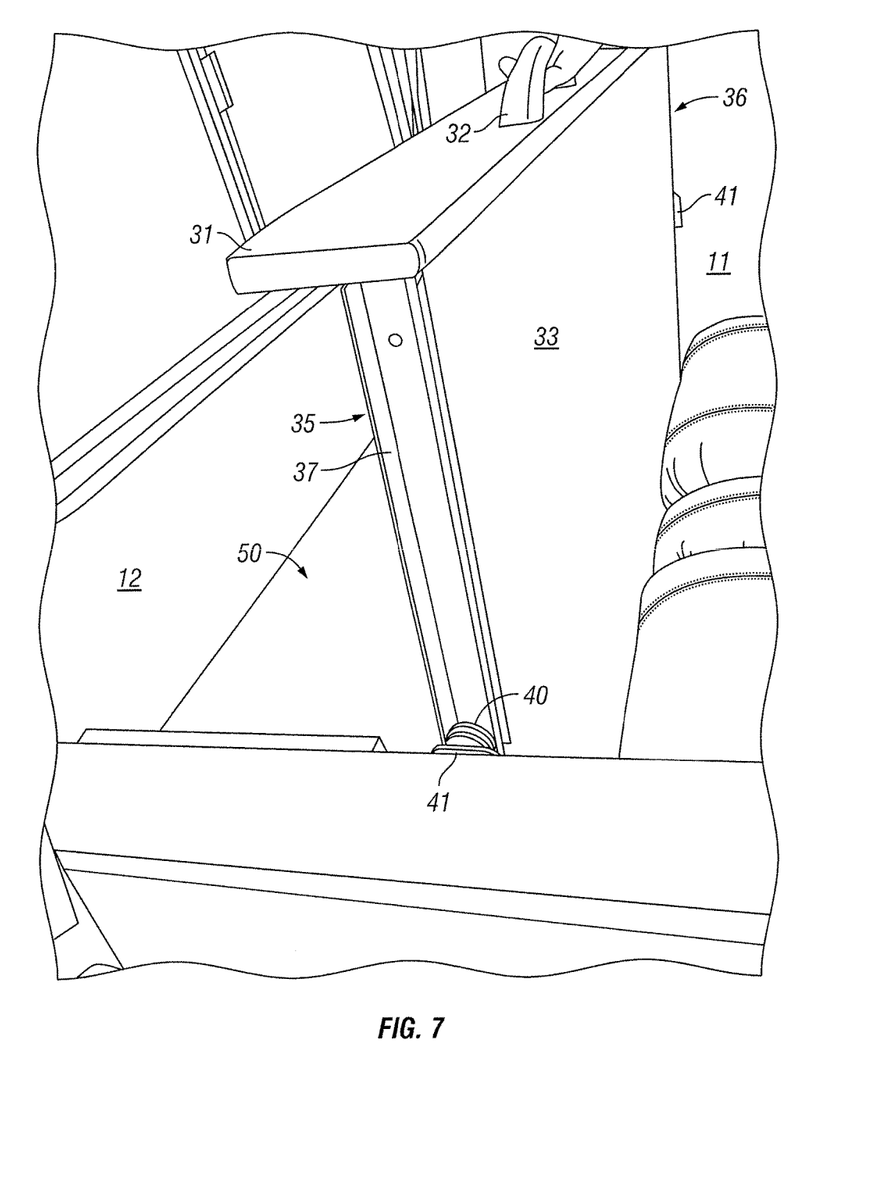
FIG. 7 is a side perspective view illustrating a track and roller guide that are components of the embodiment of the invention of FIG. 1.
Figure 8:
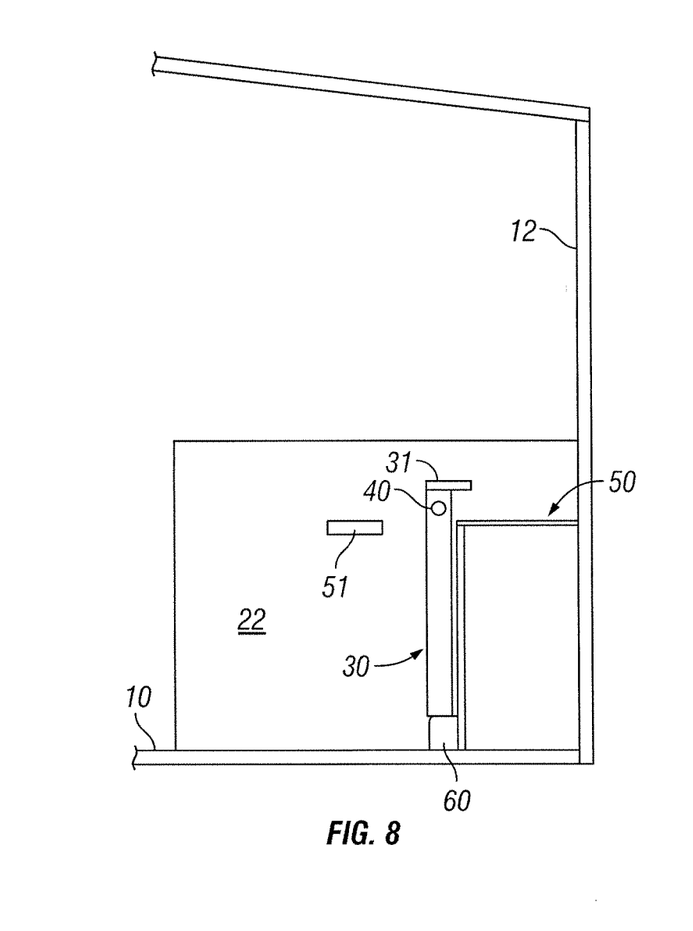
FIG. 8 is a schematic representation of certain components of the embodiment of FIG. 1 with the retractable sleeping unit in its retracted or stored position.
Figure 9:
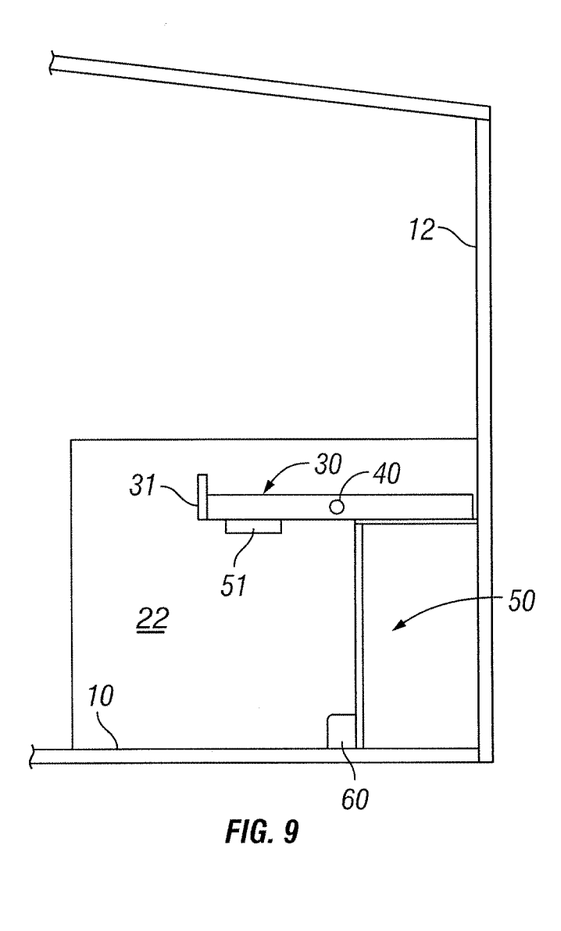
FIG. 9 is a schematic representation of certain components of the embodiment of FIG. 1 with the retractable sleeping unit in its horizontal or deployed position.

Referring to FIG. 7, unit 30 further includes a first side 35 and a second side 36. Each of side 35 and 36 are provided with a channel or guide track 37, one of which is shown in FIG. 7. As shown in FIG. 7, unit 30 may be vertically raised from behind wall 21 and pivoted to its horizontal or deployed configuration by moving unit 30 such that tracks 37 ride on rollers 40 (one of which is shown in FIG. 7) that are mounted by brackets 41 to first wall 11 of the recreational vehicle and side wall 22. As shown in FIGS. 2-6, a user may grasp one or more handles 32 (or another location on unit 30), lift unit 30 vertically from behind wall 21 and pivot it downwardly to the position shown in FIG. 6. Once unit 30 has cleared first wall 21 and has been pivoted to its horizontal position, it may be slid rearwardly such that back end 38 abuts or is adjacent to wall 12 of the recreational vehicle. A portion of unit 30 may rest on and be supported by structure 50 when in the deployed position of FIG. 6 as shown in FIG. 9. Note also that unit 30 may be provided with further support structures 51, such as, for example, brackets mounted respectively to wall 11 of the recreational vehicle and to second wall 22 as illustrated in FIGS. 8 and 9.

Although the present invention has been shown and described in detail the same is to be taken by way of example only and not by way of limitation. Numerous other modifications may be made to the embodiments shown without departing from the scope of the invention.

What is claimed is:

1. A sleeping unit for a vehicle, the vehicle having a first wall and a second wall perpendicular to the first wall, the sleeping unit including:
a first wall located inside the vehicle and spaced apart and extending generally parallel to the first wall of the vehicle;
a second wall extending generally perpendicular to the first wall of the sleeping unit;
a combined seating and sleeping unit located adjacent the first wall of the sleeping unit and between the second wall of the vehicle and the second wall of the sleeping unit, the combined seating and sleeping unit having a first section and a second section and being movable from a first configuration in which the first and second sections are generally perpendicular to one another to a second configuration in which the first and second sections are generally coplanar with one another;
a retractable sleeping unit having a first side, a second side parallel to the first side, a front end perpendicular to the first and second sides, a first surface perpendicular to the first and second sides and the front end and a second surface spaced apart from the first surface and extending generally parallel to the first surface;
a first guide track connected to the first side of the retractable sleeping unit, a second guide track connected to the second side of the retractable sleeping unit, a first roller connected to the second wall of the sleeping unit and engaged with the first guide track and a second roller connected to the second wall of the vehicle and engaged with the second guide track; and
wherein the retractable sleeping unit is movable from a first position in which the retractable sleeping unit is located in a space between the first wall of the vehicle and the first wall of the sleeping unit and the first surface of the retractable sleeping unit is parallel to the first wall of the sleeping unit by moving the retractable sleeping unit vertically and pivoting the retractable sleeping unit about the first and second rollers to a second position in which the retractable sleeping unit is located outside the space between the first wall of the vehicle and the first wall of the sleeping unit and the first surface of the retractable sleeping unit is generally perpendicular to the first wall of the sleeping unit.

2. The sleeping unit of claim 1, wherein the retractable sleeping unit is movable toward the first wall of the vehicle when the retractable sleeping unit is in the second position.

3. A sleeping unit for a vehicle, the vehicle having a wall, the sleeping unit including:
a first wall located inside the vehicle and spaced apart and extending generally parallel to the wall of the vehicle;
a second wall extending generally perpendicular to the first wall;
a combined seating and sleeping unit located adjacent the first and second walls, the combined seating and sleeping unit having a first section and a second section and being movable from a first configuration in which the first and second sections are generally perpendicular to one another to a second configuration in which the first and second sections are generally coplanar wiht one another; and
a retractable sleeping unit movable from a first position in which the retractable sleeping unit is located in a space between the first wall and the wall of the vehicle to a second position in which the retractable sleeping unit is located outside the space between the first wall and the wall of the vehicle.

4. The sleeping unit of claim 3, wherein the retractable sleeping unit is located above the first and second walls when it is in the second position.

5. The sleeping unit of claim 4, wherein the retractable sleeping unit includes a first side, a second side parallel to the first side, a front end perpendicular to the first and second sides, a first surface perpendicular to the first and second sides and the front end and a second surface spaced apart from the first surface and extending generally parallel to the first surface and wherein the first and second surfaces are generally perpendicular to the first wall when it is in the second position.

6. The sleeping unit of claim 3, wherein the retractable sleeping unit includes a first side, a second side parallel to the first side, a front end perpendicular to the first and second sides, a first surface perpendicular to the first and second sides and the front end and a second surface spaced apart from the first surface and extending generally parallel to the first surface and wherein the first and second surfaces are generally parallel to the first wall when the retractable sleeping unit is in the first position.

7. The sleeping unit of claim 3, wherein the retractable sleeping unit further includes a first side having a first guide track, a second side spaced apart from the first side and having a second guide track, a first roller connected to the second wall and a second roller connected to the vehicle, wherein the first and second guide tracks ride along the first and second rollers as the retractable sleeping unit is moved from the first position to the second position.

8. The sleeping unit of claim 7, wherein the retractable sleeping unit pivots about the first and second rollers as it is moved from the first position to the second position.

9. The sleeping unit of claim 3, wherein the second wall includes a vertically extending surface facing the combined seating and sleeping unit and further including a support member connected to the vertically extending surface of the second wall to support the retractable sleeping unit when it is in the second position.

\* \* \* \* \*